US010937098B2

(12) United States Patent
Sujir

(10) Patent No.: US 10,937,098 B2
(45) Date of Patent: Mar. 2, 2021

(54) METHOD AND SYSTEM FOR GROUPS OF INDIVIDUALS TO FORM AND MANAGE AN INVESTMENT CLUB FOR TRADING IN PUBLICLY TRADED SECURITIES, ENABLING INDIVIDUALS TO MONITOR THEIR HYPOTHETICAL PERFORMANCE AND EMBRACING THE FEATURES OF AN ONLINE SOCIAL NETWORK

(71) Applicant: VOLEO, INC., Vancouver (CA)

(72) Inventor: Henry Jay Sujir, Vancouver (CA)

(73) Assignee: Voleo, Inc., Vancouver (CA)

( * ) Notice: Subject to any disclaimer, the term of this patent is extended or adjusted under 35 U.S.C. 154(b) by 603 days.

(21) Appl. No.: 15/311,099

(22) PCT Filed: May 19, 2015

(86) PCT No.: PCT/CA2015/050448
§ 371 (c)(1),
(2) Date: Nov. 14, 2016

(87) PCT Pub. No.: WO2015/176181
PCT Pub. Date: Nov. 26, 2015

(65) Prior Publication Data
US 2017/0076392 A1 Mar. 16, 2017

Related U.S. Application Data

(60) Provisional application No. 62/000,927, filed on May 20, 2014.

(51) Int. Cl.
*G06Q 40/06* (2012.01)
(52) U.S. Cl.
CPC .................................. *G06Q 40/06* (2013.01)

(58) Field of Classification Search
None
See application file for complete search history.

(56) References Cited

U.S. PATENT DOCUMENTS

| 6,240,415 B1 * | 5/2001 | Blumberg | G06Q 10/10 |
| 6,601,044 B1 * | 7/2003 | Wallman | G06Q 40/00 |
| | | | 705/35 |

(Continued)

OTHER PUBLICATIONS

"Why Day Trading Stocks is not the Way to Invest" (Year: 2015).*
PCT International Search Report dated Jul. 22, 2015 issued in respect of PCT Application No. PCT/CA2015/050448.

*Primary Examiner* — Bruce I Ebersman
(74) *Attorney, Agent, or Firm* — Todd A. Rattray; Oyen Wiggs Green & Mutala LLP

(57) ABSTRACT

A system for forming and managing online investment clubs utilizes the features of an online social network to provide advantages in the operation of such online investment clubs. The system permits users to follow and assess the investment skill of other investors in their own or other investment clubs and to follow such individuals' future investment decisions and those of other investment clubs. Unlike in existing investment clubs, the system maintains a constant real time evaluation of each user's investment decisions whether or not they were followed by the club, and ranks that valuation against all other users. The evaluation of each user's investment decision also provides the necessary information for the platform to compile various performance metrics of the individuals. The social networking features of a computer network permit a user of the system to view all such rankings of other users in the system, and the performance of all other funds in the system, to choose to follow such other users or funds and use such information to assist the investment decisions of that user.

4 Claims, 29 Drawing Sheets

(56) References Cited

U.S. PATENT DOCUMENTS

| | | | | |
|---|---|---|---|---|
| 6,606,615 B1* | 8/2003 | Jennings | | G06Q 10/06 |
| | | | | 706/45 |
| 7,016,872 B1* | 3/2006 | Bettis | | G06Q 20/042 |
| | | | | 705/35 |
| 7,110,971 B2* | 9/2006 | Wallman | | G06Q 40/00 |
| | | | | 705/36 R |
| 7,401,039 B1* | 7/2008 | Lin | | G06Q 20/10 |
| | | | | 705/35 |
| 2001/0042037 A1* | 11/2001 | Kam | | G06Q 20/0855 |
| | | | | 705/36 R |
| 2002/0002520 A1 | 1/2002 | Gatto | | |
| 2002/0038236 A1 | 3/2002 | Schechter et al. | | |
| 2007/0038544 A1* | 2/2007 | Snow | | G06O 40/00 |
| | | | | 705/36 R |
| 2009/0240574 A1* | 9/2009 | Carpenter | | G06Q 40/06 |
| | | | | 705/36 R |
| 2009/0271332 A1* | 10/2009 | Lo | | G06Q 40/04 |
| | | | | 705/36 R |
| 2011/0302105 A1* | 12/2011 | Yakubov | | G06Q 40/06 |
| | | | | 705/36 R |
| 2014/0089228 A1* | 3/2014 | Silberman | | G06Q 50/01 |
| | | | | 705/36 R |

* cited by examiner

METHOD AND SYSTEM FOR GROUPS OF INDIVIDUALS TO FORM AND MANAGE AN INVESTMENT CLUB FOR TRADING IN PUBLICLY TRADED SECURITIES, ENABLING INDIVIDUALS TO MONITOR THEIR HYPOTHETICAL PERFORMANCE AND EMBRACING THE FEATURES OF AN ONLINE SOCIAL NETWORK

CROSS REFERENCE TO RELATED APPLICATION

The present application claims the benefits, under 35 U.S.C. § 119(e), of U.S. Provisional Application Ser. No. 62/000,927 filed May 20, 2014 entitled "Method and System for Groups of Individuals to Form and Manage an Investment Club for Trading in Publicly Traded Securities" which is incorporated herein by this reference.

TECHNICAL FIELD

The invention relates to the field of investment clubs and more particularly to investment clubs which are operated online.

BACKGROUND

Investment clubs have long been in existence as a vehicle for individuals to join with a group of investors in order to form a larger pool of funds for investments, to spread the risk over a greater number of investors and investments, and to draw on the investment knowledge and experience of a larger group. Typically such investment clubs have been structured as partnerships. Business is typically conducted by way of monthly meetings in person, at which consensus is reached and sometimes votes are taken on whether to invest money in particular investments, sell investments or hold them.

United States Published patent application, publication no. 2002/0038236 discloses a method of using the Internet to facilitate the voting process in an investment club. A brokerage firm may provide to its customers a platform for setting up an investment club where individuals may go on-line to a site for voting on investment decisions or decisions on how the club should be run. The site tallies the vote and an employee of the broker implements the authorized action, such as a financial transaction through the brokerage. However such system does not take advantage of the features of an online social network, for example to keep track of and quantify the investment decisions of the individual club members and make the information available to others. While facilitating online voting, such system did not form an online community of individuals for sharing information, and cooperating on investment decisions as might be provided in a computer-implemented online social network.

The foregoing examples of the related art and limitations related thereto are intended to be illustrative and not exclusive. Other limitations of the related art will become apparent to those of skill in the art upon a reading of the specification and a study of the drawings.

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

SUMMARY

An embodiment is disclosed which utilizes the features of an online social network to provide advantages in the operation of online investment clubs. More particularly the present embodiments permit users to follow and assess the investment skill of other investors in their own or other investment clubs and to follow such individuals' future investment decisions and those of other investment clubs. Unlike in existing investment clubs, the system maintains a constant real time evaluation of each user's investment decisions whether or not they were followed by the club, and ranks that valuation against all other users. The evaluation of each user's investment decision also provides the necessary information for the platform to compile various performance metrics of the individuals such as user alpha and beta as such terms are understood in financial markets or Sharpe ratios. (In general the alpha is the excess return of an investment above the cost of the risk borne, and in some cases relative to a benchmark index. The beta is the measure of the volatility of the investment compared to the market as a whole.) The social networking features of a computer network permit a user of the system to view all such rankings of other users in the system, and the performance of all other funds in the system, to choose to follow such other users or funds and use such information to assist the investment decisions of that user. That would be impossible without the use of a computer network. Further the application of the system to mobile devices facilitates the need of such systems to reach rapid decision-making among club members.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
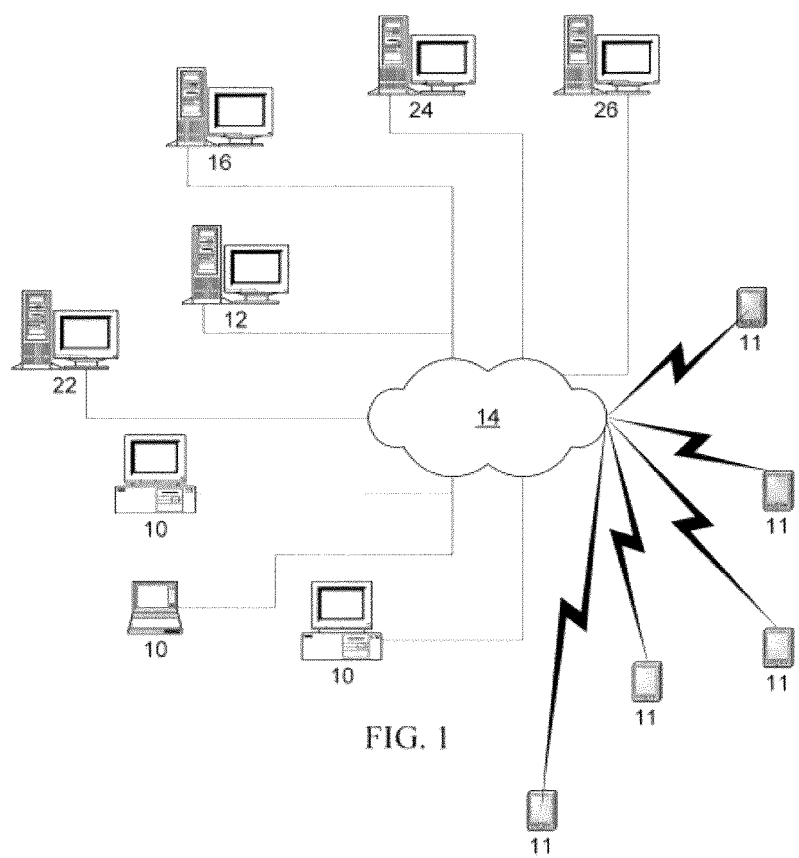
FIG. 1 is a schematic diagram illustrating a network or system used to carry out the invention.

With reference to FIG. 1, the method of an embodiment is carried out by users via a plurality of mobile devices 11 such as smart-phones, tablets and the like which are provided with the necessary mobile application software. Users may also use computer terminals 10, whether desktop, laptop, mobile device or the like, provided with the application software, and web browser client software, accessing the system server 16 through a web portal site maintained by a web server 12, for registering and downloading via the Internet 14 or other computer network. Users may use a social network hosting server 22 such as Facebook™ or Twitter™ to communicate and distribute invitations. The social network server 22 also accesses system server 16 via the Internet 14 and communicates with the system server 16 for user authentication. A market data provider 24 and brokerage 26 may also access system server 16 by the Internet or a local network.

The system described as follows ("Voleo") is a mobile application and website platform in which groups of individuals (herein, "users" or "partners") can use the platform to form, finance, and manage an investment club (herein a "club" or "fund") which holds and trades publicly traded securities, on an interactive basis. Each user can use the platform for multiple funds in which he/she is a member. In legal terms, each Voleo fund is a joint account or investment club partnership but the platform is presented and accessed in a similar format as would be presented and accessed in a managed investment fund as shown on typical fund investment websites. Trades on the Voleo system occur automatically, in accordance with a majority vote of each fund's partners either through a network interface with a licensed online broker, or by Voleo if the system has status as a registered broker-dealer. Statistics are maintained on all aspects of fund performance as well as on the performance of each of the fund partners. Fund performance is assessed on the same basis upon which mutual funds are typically assessed. The performance of each partner is assessed on the theoretical basis that all of their investment decisions (votes and proposals) had been carried out regardless of whether they were actually implemented (i.e. by majority vote) or not. This track record is referred to in the platform as a user's "DROID" (the acronym for "definitive return on investment decisions") and is calculated and shown as annualized percentage return on investment ("ROI") using, for example, the "modified Dietz formula" or the "time weighted return" formula to calculate ROI. The Voleo platform allows and encourages users to be partners in multiple funds and the platform displays each user's aggregated proportionate interests in each of the funds in which he/she is a partner. These may be displayed individually or aggregated into a single fund view in the Voleo platform and is referred to as "My Funds". The platform also enables users to research publicly traded entities, has a notification function in which users are notified of relevant events, and contains a "Community" section in which users can view the performance of other users and funds, and if desired, watch or follow the investment decisions and performance of other users, and the completed trades and performance of other funds (referred to as a "Follow" function). Preferably all data respecting dollar values and percentage changes shown on the Voleo platform is on a real time (less than a 15 minute delay) basis.

Figure 2:
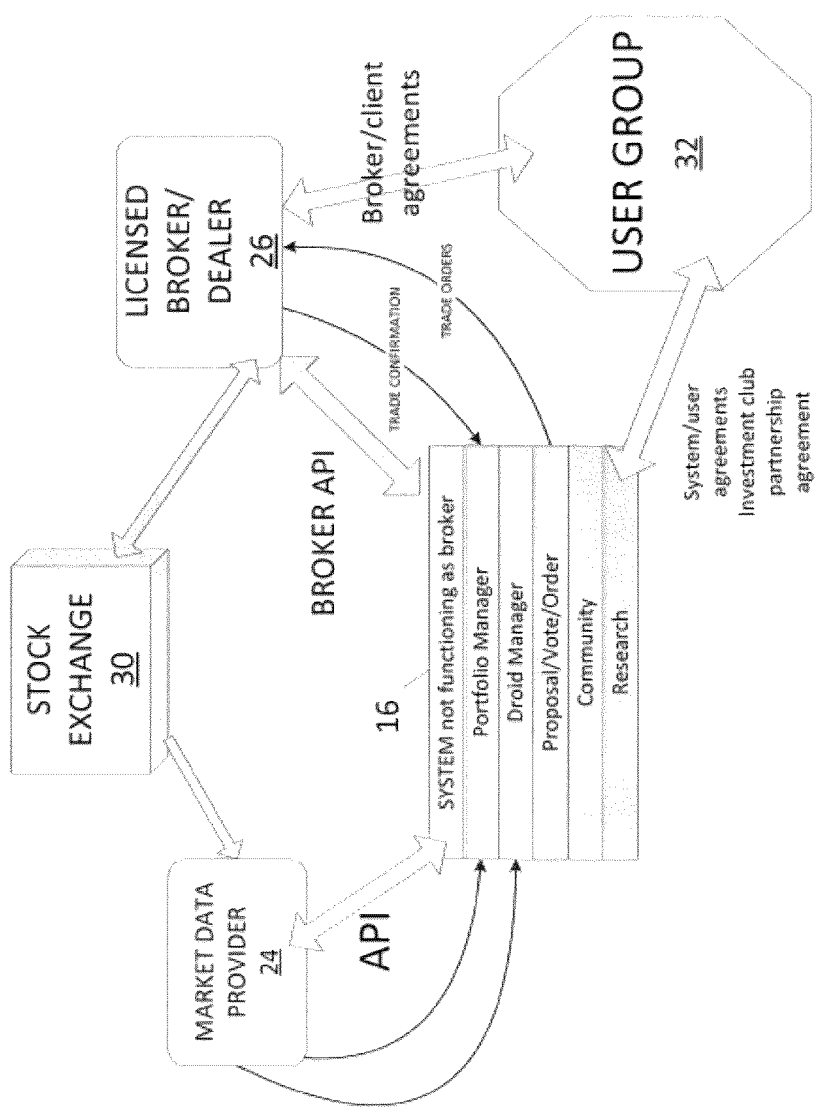
FIGS. 2, 3 and 4 are schematic block diagrams illustrating the architecture of three embodiments of a system for carrying out the invention.
Figure 3:
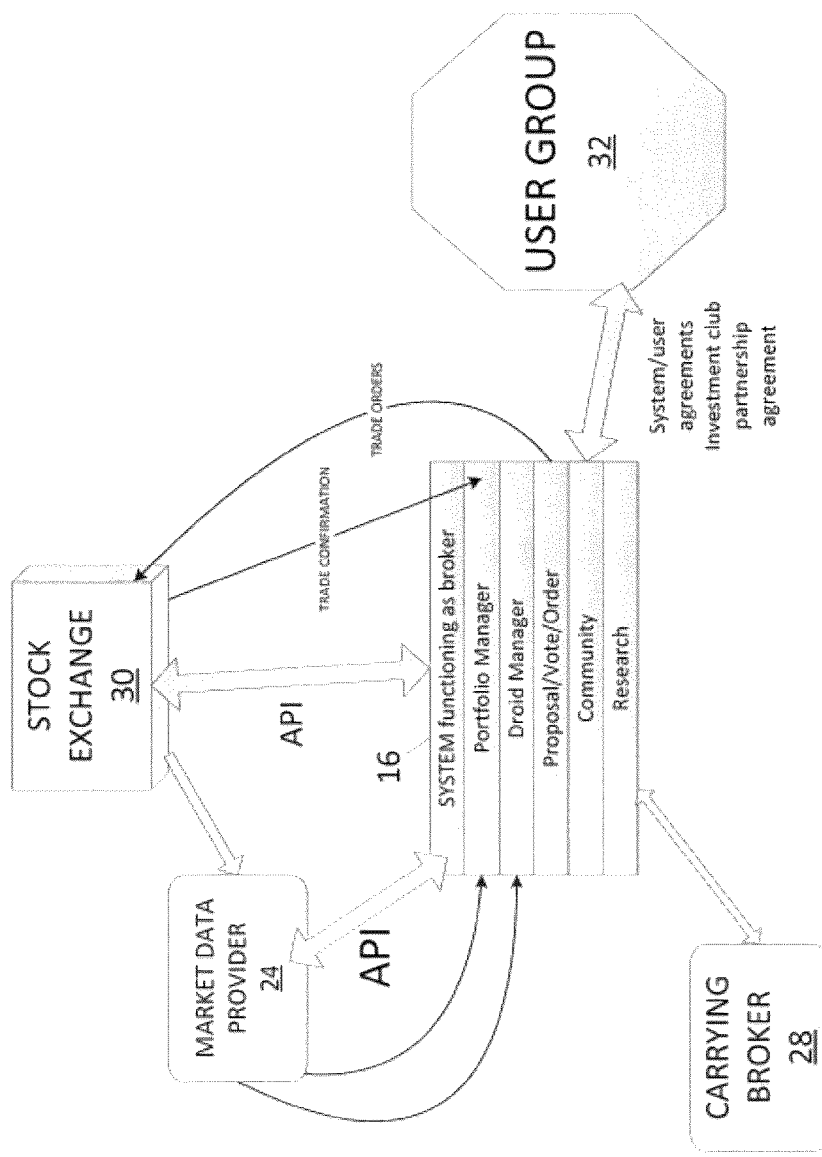
Figure 4:
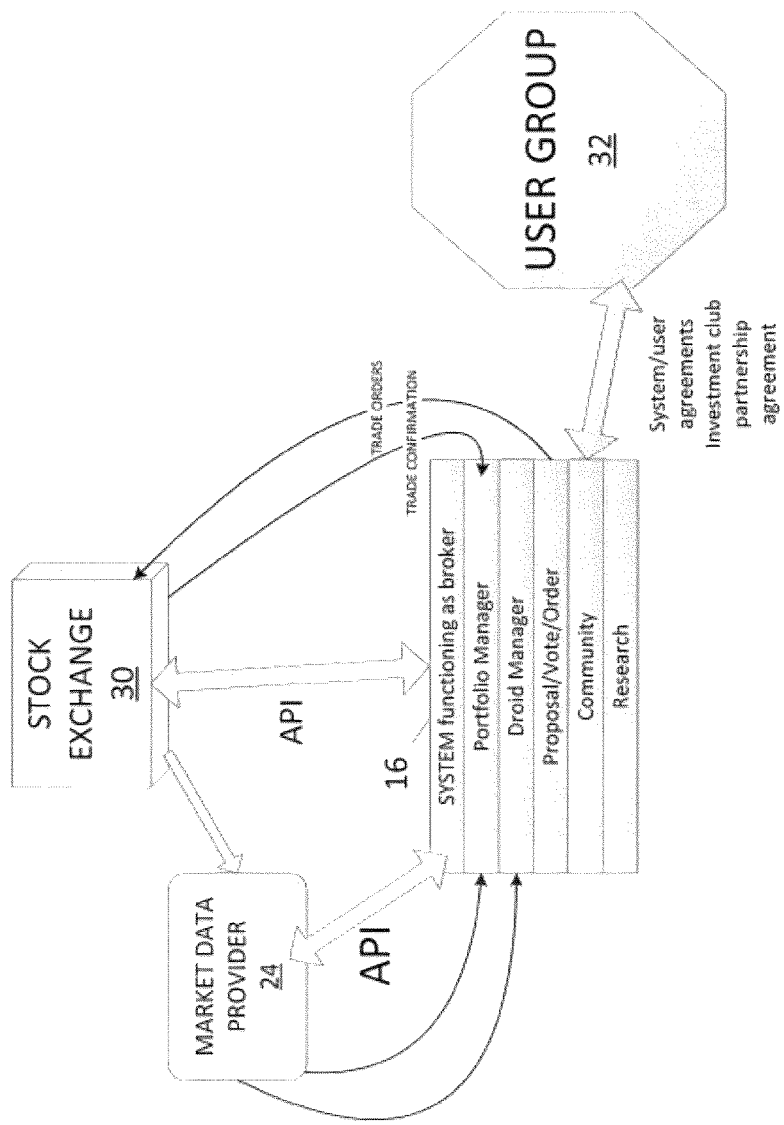

FIGS. 2 through 4 illustrate the architecture of three embodiments of the invention. In FIG. 2, the system 16 does not function as the registered broker but rather makes trade orders through a licensed broker 26. The system server 16 communicates such trade orders to, and receives trade confirmations from, the licensed broker 26 through a Broker Application Programming Interface ("API"). The broker makes such trades through a stock exchange 30. Market data is provided to the system server 16 via an API by a market data provider 24 which receives real time data from stock exchange 30.

The members of the investment club/user group 32 have entered into an investment club partnership agreement among each other and enter into user agreements with the system. The investment club partnership agreement and/or the user/system agreement include terms governing how investment decisions will be made (e.g. simple majority or perhaps a special majority for larger investments; the length of time allowed to vote on proposed investment decisions; the specific stock exchanges through which investments can be made; the market indices from which investments can be chosen; limits on the size or nature of investments, etc.). In the embodiment shown in FIG. 2, each user also enters into an agreement with the licensed broker 26 to open a trading account to hold the user's funds, thereby becoming a client of the broker.

In the embodiment shown in FIG. 3, the system 16 functions also as the licensed broker, and makes trade orders directly to the stock exchange. The system may use a carrying broker 28 to carry out back-office, clearing and custodial functions for the users, or as in FIG. 4 the system 16 may carry out all functions of the broker without a carrying broker.

The system server 16 may use a Drupal Content Management System to handle system administration of its web site, including account registration and maintenance. Preferably, as shown in FIG. 2-4, the system server maintains the data required to manage portfolios, track DROID values, carry out votes etc. on a MySQL database. However some or all of those functions may be provided by a third party supplier such as the Market Data Provider 24. For communications between mobile application users and the system server 16 a JavaScript Object Notation format for data exchange may be used.

Starting a Fund

Any person ("inviter") may start a fund using the Voleo platform by sending out invitations using email, Facebook, Twitter, or other social media interfaces (including Voleo itself) up to a maximum number of (e.g. 99) persons ("invitees"). Each fund is required to have a minimum number (preferably, say, 3), and a maximum number (e.g. 100) of partners. The invitation will contain a short (preferably maximum 140 character) description of the funds purposes as set by the inviter and the funding requirements for each partner. All partners of a fund, including inviters, are required to make the same initial financial contribution. Invitees must respond within a specified period of time (e.g. two business days) as to whether they wish to join, and will have a further specified period of time (e.g. five business days) to complete the requisite documentation to establish the partnership. Invitations will have default settings as to certain terms of the investment club partnership agreement, such as the term of the partnership (e.g. one year) and the length of time in which each user has to respond to proposals by other partners (e.g. beginning of next trading session), which can be modified by the invitee prior to sending out invitations, and subsequently by unanimous vote of partners. Upon accepting an invitation, the new partner completes a user profile (whether at the system website 12 or through the mobile app), and is linked to complete the system/user agreement, club partnership agreement and brokerage documentation for acceptance and signature (digital, electronic or handwritten as required by law).

Figure 5:
FIGS. 5 through 28 are images of screen displays illustrating the method and system of the invention.

As soon as the membership has been established for a club and that investment club account has been funded, each partner is assigned a home page ("My Funds", FIG. 5), which will be that person's home page for his/her participation on the Voleo platform, including for any subsequent funds. FIG. 5 shows the format for a user's home page on the mobile platform. In this example the aggregate value of all the user's funds ("My Assets"), a graph display showing the performance of each fund over a time period which can be selected by the user (for example, today, last 5 days, last month, last 3 months, last 6 months, last year, last two years) and the user's performance for that period can be displayed. The user's performance since joining Voleo is also displayed. Although the format on the Voleo web site may be shown somewhat differently because of its larger size, the functionality is largely the same on the web page and mobile applications.

Figure 6:
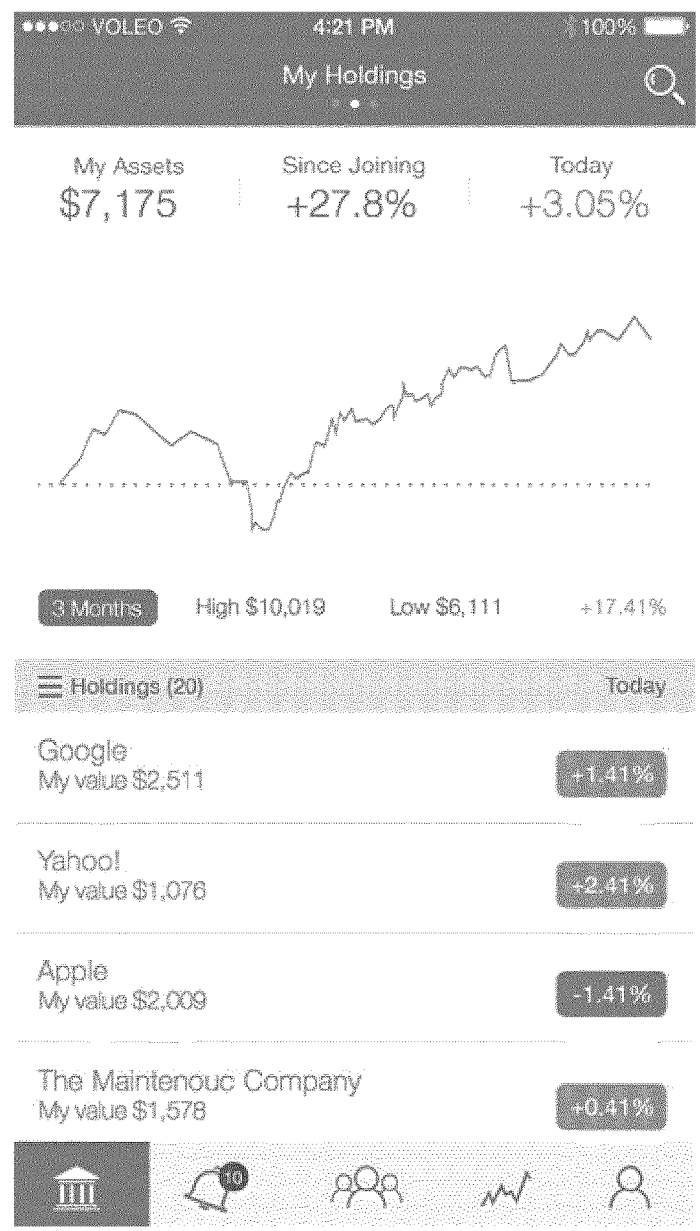
Figure 7:
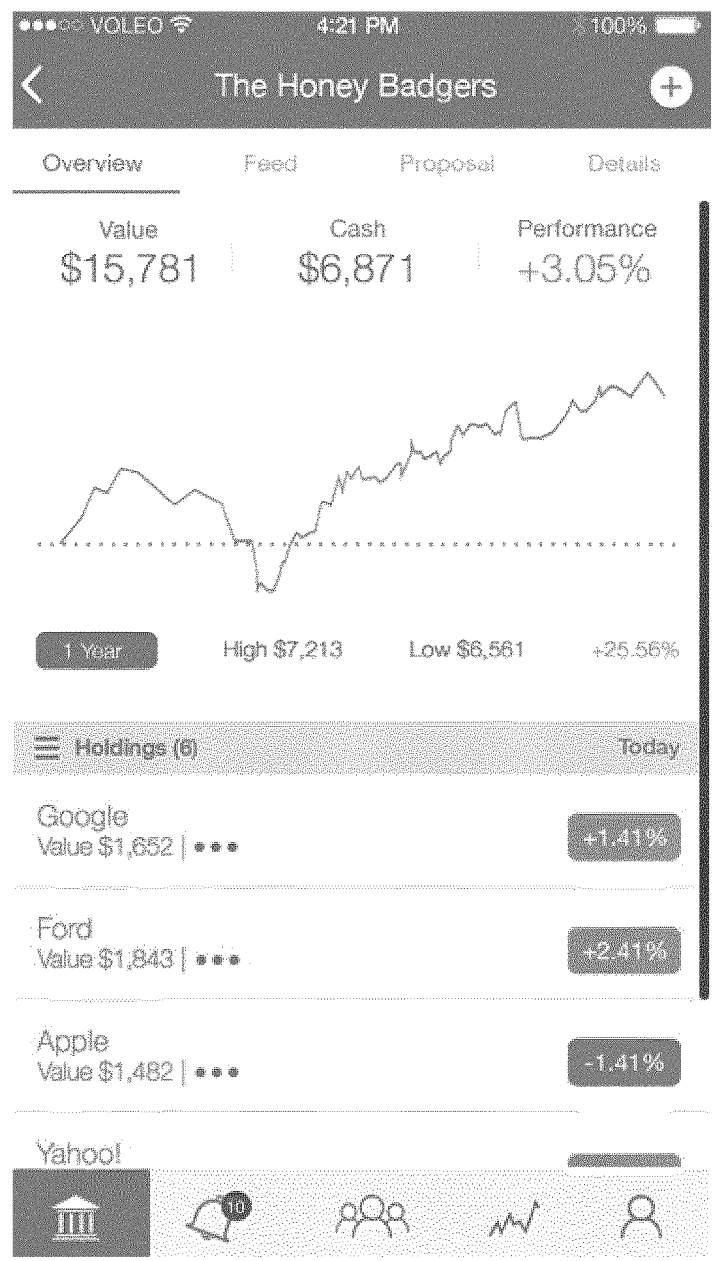
Figure 8:
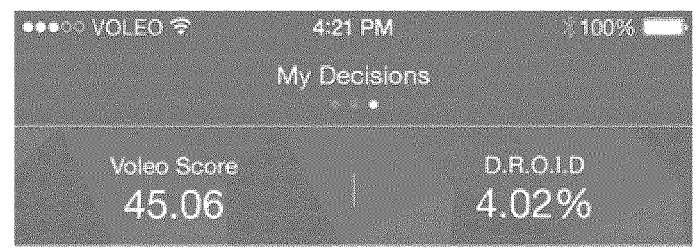

Swiping will navigate the user from "My Funds" to "My Holdings" to "My Decisions", as shown in FIGS. 6 and 8 respectively. Selecting any fund in which the user is a member navigates the user to the respective "Fund Holdings" page as discussed below under FIG. 7. As with all pages, the navigation pane (either at the bottom of the page or accessed by menu depending on the operating system) shows icons linking to (from left to right in FIG. 6) "My Funds" (which when selected returns to the user's home page), "Notifications" (which when selected leads to the platform's alerts inbox discussed below under FIG. 21), "Community" (which when selected leads to the platform's Community section discussed below in connection with FIG. 16), "Research" (which when selected leads to the platform's Research page discussed below under FIG. 9), and "Profile" (which when selected leads to the user's Profile page discussed below under FIG. 27).

As shown by way of illustration in FIG. 6, once a user has swiped from the My Funds page to My Holdings they are presented with a list of all securities held across all of that user's Voleo fund interests, and an indication of the size or value of their interest in each security. This enables a user to easily view their aggregate positions and aggregate performance across all of their Voleo funds. Selecting a security will direct the user to the "Fund Holdings" page of the Voleo fund in which they hold the security. If a security is held in two or more funds they will first choose the Voleo fund they are a member of which holds this security. Again the user may select a time period to show the performance graph, and may sort the securities by value, alphabetically or other criteria such as performance.

Selecting the fund name on the My Funds page, or the security or fund on the My Holdings page, leads to the performance page of the relevant Voleo fund. As an example, FIG. 7 shows the performance or "Overview" page for a selected fund. The top of the page indicates the full name of the fund. In the "Overview" section, the figures below that name indicate the total value of the fund on an aggregate basis and the percentage performance of the fund. The graph below indicates the performance visually with alternative graphs for different periods available by selecting the relevant time period beneath the graph. Real time and historical stock exchange data to calculate these various values is provided by the Market Data Provider 24 and calculations and graph creation may be done either by system server 16 or by the Market Data Provider 24 or other third party provider. The list of holdings by security follows, with links to additional information on the security, and transaction history. Users are also able to make proposals on existing positions or new securities.

Figure 15:

My Decisions is the other page within the home section, shown in FIG. 8. This section tracks the hypothetical positions that a user would have if the club had supported their proposals and votes, and continues to track the gains and losses on those hypothetical positions until the user chooses to 'lock' the simulated gains or losses. These gains or losses contribute to the user's Definitive Return On Investment Decisions, or DROID. The DROID is a component of the features derived from social media integration, and also introduces an element of gamification to investing. The Long Positions in FIG. 8 are the result of the user proposing to purchase, or voting to purchase, a security position which was not approved by a majority of the fund's partners. A Short Position is created only where a user proposes or votes to sell a position which is not in his DROID portfolio, (which implies he or she originally voted against purchasing it, but the majority of partners voted to purchase it). If a user abstains from voting, their DROID portfolio will assume that they have voted in accordance with the majority position of the group. On this page, users can 'lock' gains or losses, such as by clicking the lock icon, which will move hypothetical positions from this list to the Decision History section (FIG. 15). Together, the positions and history contribute to each user's public profile (FIG. 20) which will be visible to partners and, in a redacted way, to other users on the platform subject to privacy settings. The DROID can also be adjusted to provide a "Voleo Score" to provide a more useful way of assessing a user's performance. For example the Voleo Score may be an adjustment of the DROID based on algorithms which may incorporate alpha and beta risk ratios, Sharpe ratios, the contribution of proposals and not votes, activity, consistency, performance against benchmark indices, statistical relevance based on sample size, as well as a separate theoretical calculation based on the assumption that all of a user's votes in favour were votes against etc.

Figure 9:
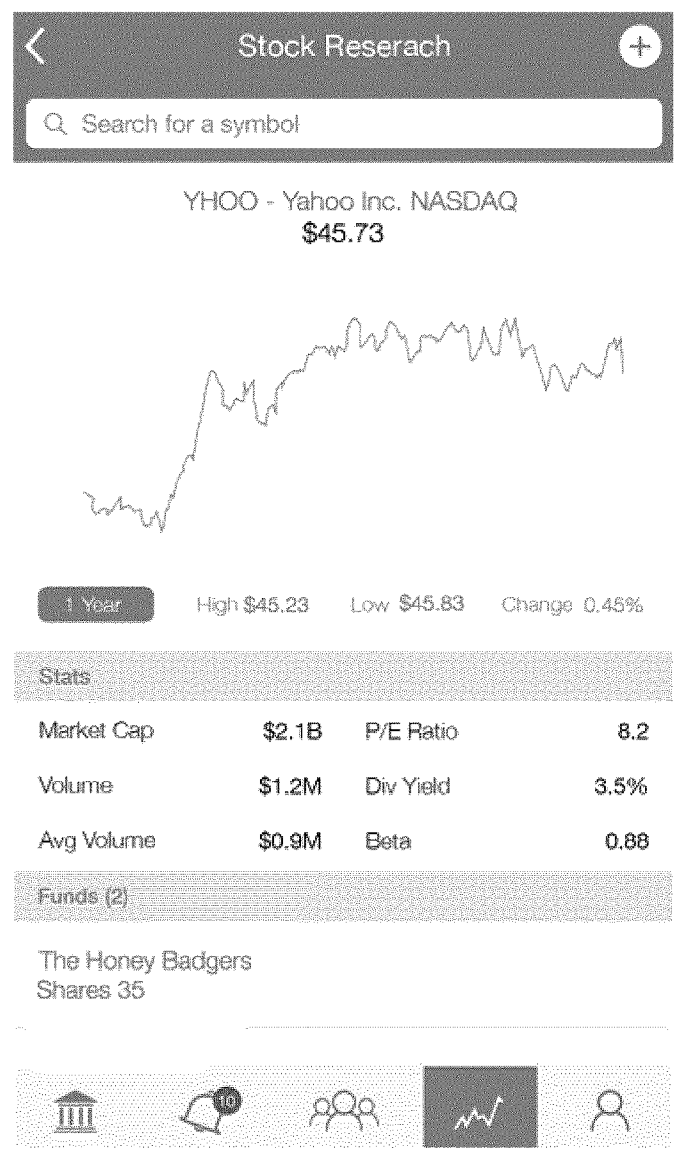
Figure 27:
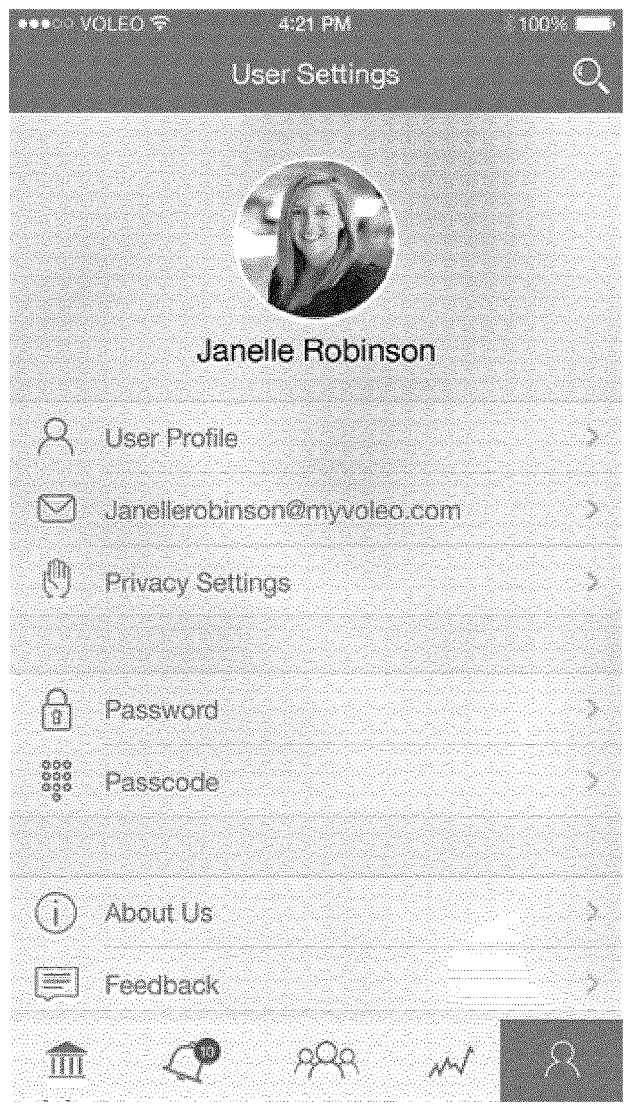

The trading names/symbols on any page in the Voleo platform contain live links which, when selected, direct the user to a research page on the security represented by the name/symbol. The research page will appear on the user's screen, as shown in FIG. 9. The research page can also be accessed by clicking on the magnifying glass icon as shown in FIGS. 5, 6 and 27. The live research page shown in FIG. 9 is the same page as the reader would be led to if he/she used the research button shown at the bottom of the screen and looked up the security or its trading symbol. Each research page may contain links to news, analyst reports, market statistics, financial statement data, community and other information pertaining to the issuer of the security designated at the top of the page. Again this real time and historical stock exchange data is provided by the Market Data Provider 24.

Figure 10:

Referring to FIG. 10, this "Details" section of the page for a selected fund lists the user names of each of the partners in the selected fund, and the performance of each partner relative to the platform as a whole, such as by way of the Voleo score. It also indicates the level of activity per member based on their proposals and posts. Messaging on the platform can be to members of the same fund, individually or collectively, but not across multiple funds. Viewing the fund records by "View Fund Records" will take the user to the screens shown in FIG. 25 which provide additional information in the form of logs on joining and exit dates, funding amounts and dates, proposal and voting activity, and detailed transaction history as further described below.

Figure 11:
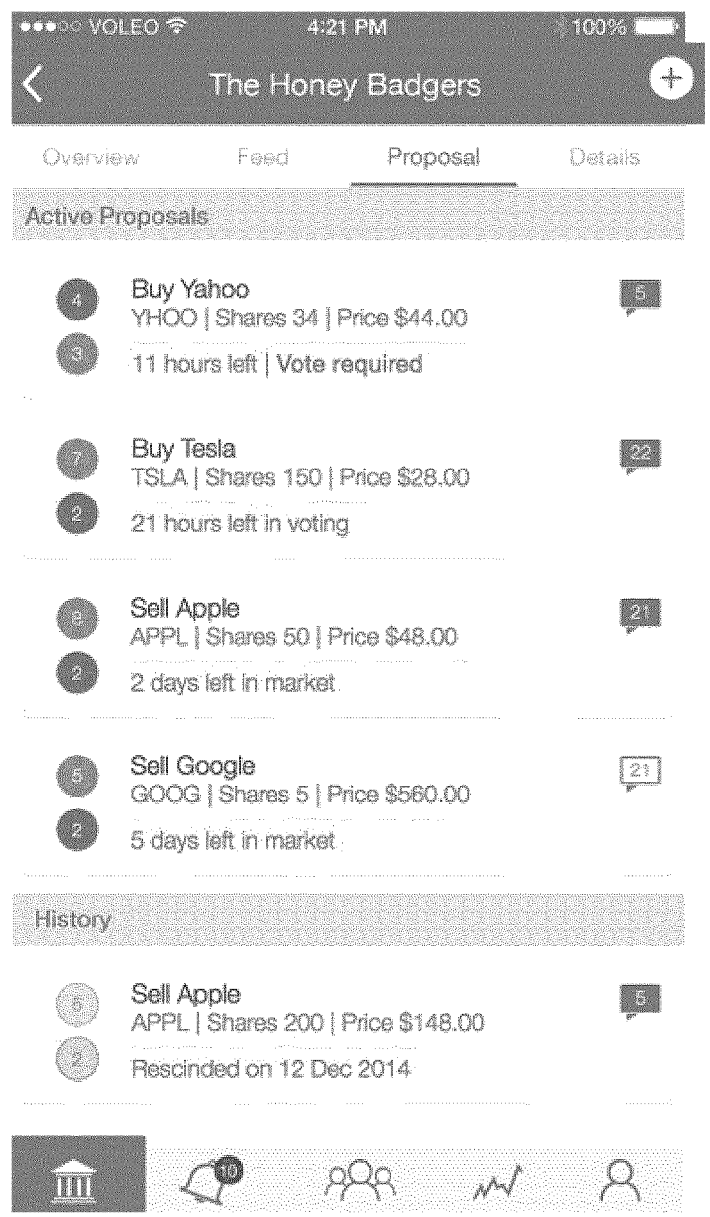

With reference to FIG. 11, this "Proposals" section of the page for a selected fund shows proposals for transactions made by partners in the selected fund. A brief description of the proposed transactions is listed, along with details on the status of current voting, how much time remains on the proposal or underlying order, and whether action is required. Links to the detailed proposal screen as well as the related discussion are provided, and a history of previous proposals will be shown beneath any active ones.

Figure 12:

The screen shown in FIG. 12, displayed by electing one of the proposals in FIG. 11, shows the identity of the user who made the proposal, the relevant fund, the parameters of the proposal, a link to any message the user making the proposal provided to the partners concurrent with the proposal together with ensuing discussion, the deadline time for voting on the proposal, and boxes which if selected register the user's vote as a "Yes" or "No". Non-vote by a partner as at the deadline time will be treated as a vote along with the majority, or no vote if there is no majority. From the proposal screen the user may also select "Discuss" to send a message to all fund partners to make comments or request clarification on the proposal. FIG. 12 also contains the chart and a link to the research page for the issuer in respect of which a vote is required. Users will be able to scroll down to identify who has voted, how they have voted and who has yet to respond.

Figure 13:
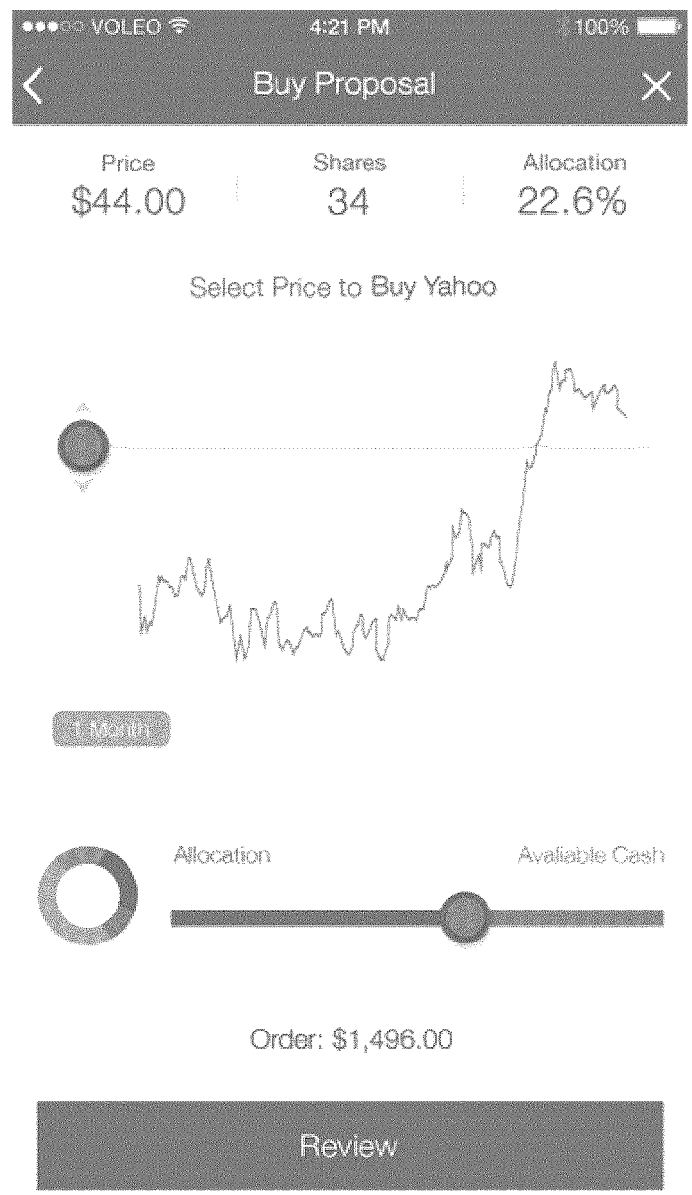

FIG. 13 illustrates how a proposal to buy or sell a security is made by a user. By selecting the "+" icon in FIG. 7, 9-11 or 22, the user may choose to make either a new proposal or a new discussion. If the user selects to make a new proposal, the relevant fund and security are selected and the user is presented with a means to determine the price and quantity of the security. An intuitive portfolio allocation view and slider can be provided as shown in FIG. 13, visually displaying the maximum cash required for this proposal based on the limit price and quantity (for buy orders), to enhance the user experience. On clicking 'Review', the user is given a summary of the proposal and provided with an opportunity to include a note that will be sent to the user's partners (FIG. 14).

Figure 14:
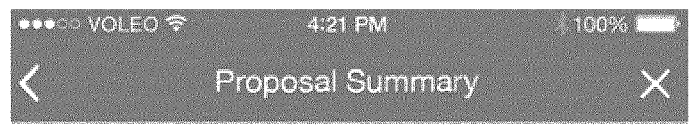
Figure 21:
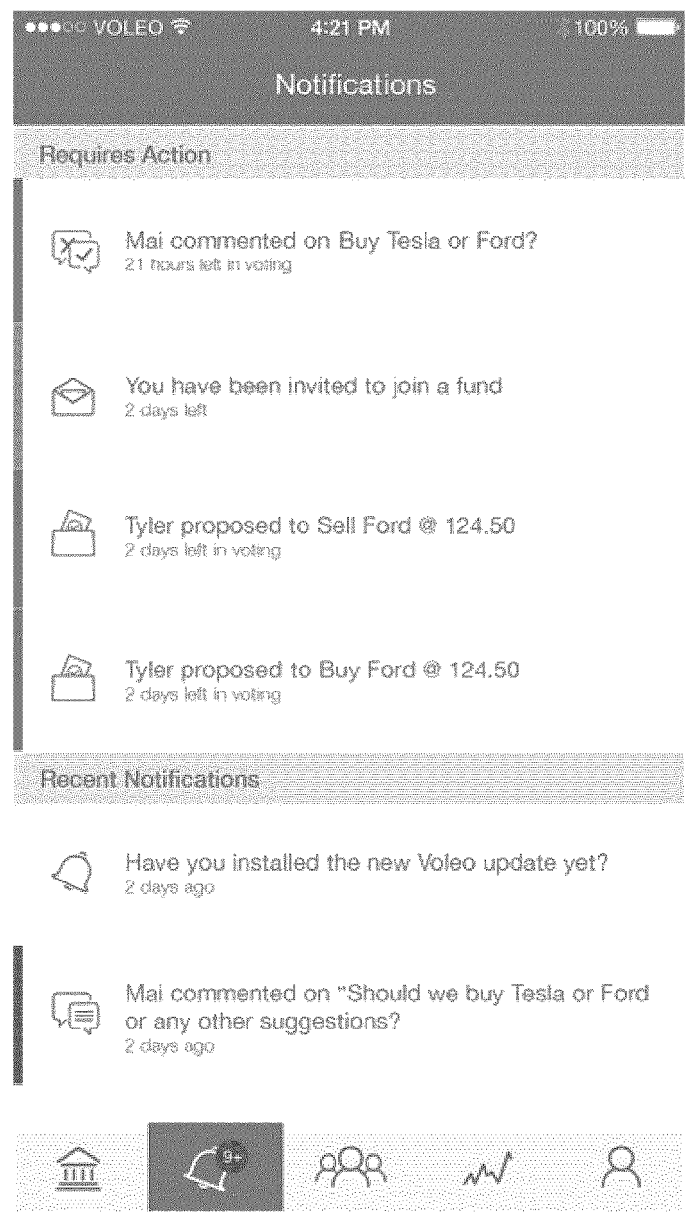

FIG. 14 illustrates the "Proposal Summary" page where relevant proposal details are presented to the creator of the proposal before sending. The selected fund, trade type, symbol, limit price, quantity, commission and estimated trade value (assuming the trade is executed at the limit price) is displayed. The user has the opportunity to add a note which will be attached to the proposal as it goes to partners. On clicking 'Send Proposal', the proposal moves to the "Proposals" section of the relevant fund (FIG. 11) and a notification to partners appears in their "Notifications" section (FIG. 21). The proposer's vote is automatically cast in favor.

Figure 20:

The Decision History page in FIG. 15 contains a record of all positions that have impacted a user's DROID, including both the hypothetical security positions as aforementioned and also the actual positions that the user held through its funds having supported successful proposals. A redacted version of this information is displayed in the public user profile page (FIG. 20).

Figure 16:

With reference to FIG. 16, this illustrates the Community page which is displayed when the "Community" icon at the bottom of each page is selected. The Community is another part of the social network experience of Voleo, where top performing funds based on return as well as top individuals, based on DROID or other DROID related performance measures, will be profiled. When a fund or user profile is selected, its detailed holdings and decision history is presented in a redacted way that does not show the user's actual name or actual fund values for reasons of privacy. The Community section also has links which when selected lead to more funds and individuals. There may be included incremental abilities to search and filter by fund name, user alias, investment style, risk profile, etc.

Figure 17:
Figure 18:
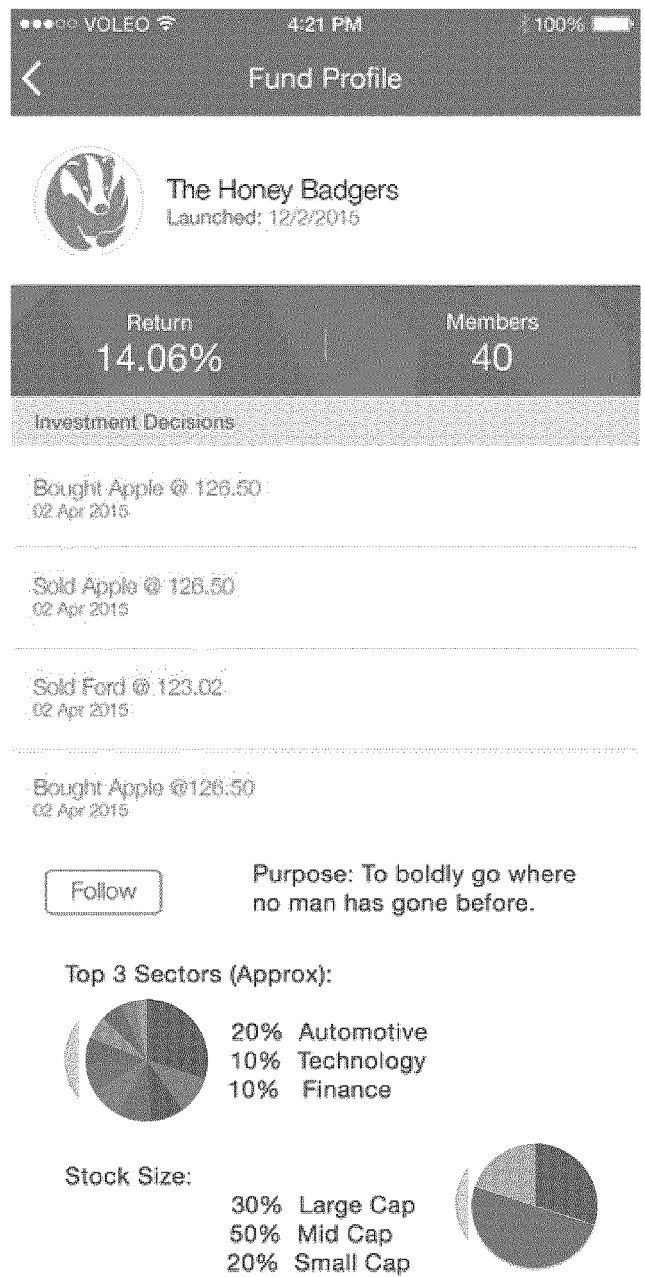

FIG. 17 shows the screen display which lists the top funds in the platform, ranked by their annualized % rate of return on initial investment. The user can also scroll down to see more funds ranked in the same manner. When a fund is selected, the user is served a page which shows certain limited information as to that fund. As an example, FIG. 18 shows the limited fund profile. This page shows no dollar figures or amounts for the fund's holding, for reasons of privacy, but includes a history of transactions (and may include information about the portfolio composition, sector and capitalisation weighting, risk profile, investment objective, etc). The return gives information as to the fund's % change since it became active. The screen contains a "Follow" feature which, when selected, will cause immediate notifications of all confirmed trades of the fund to be sent immediately and appear in the user's "Notifications" at the bottom of each page. This notification will indicate that a security has been sold or bought by the fund being followed, the name of the security and the price at which it was sold or bought, but it will not show the aggregate dollar amount of the trade or the number securities traded.

Figure 19:
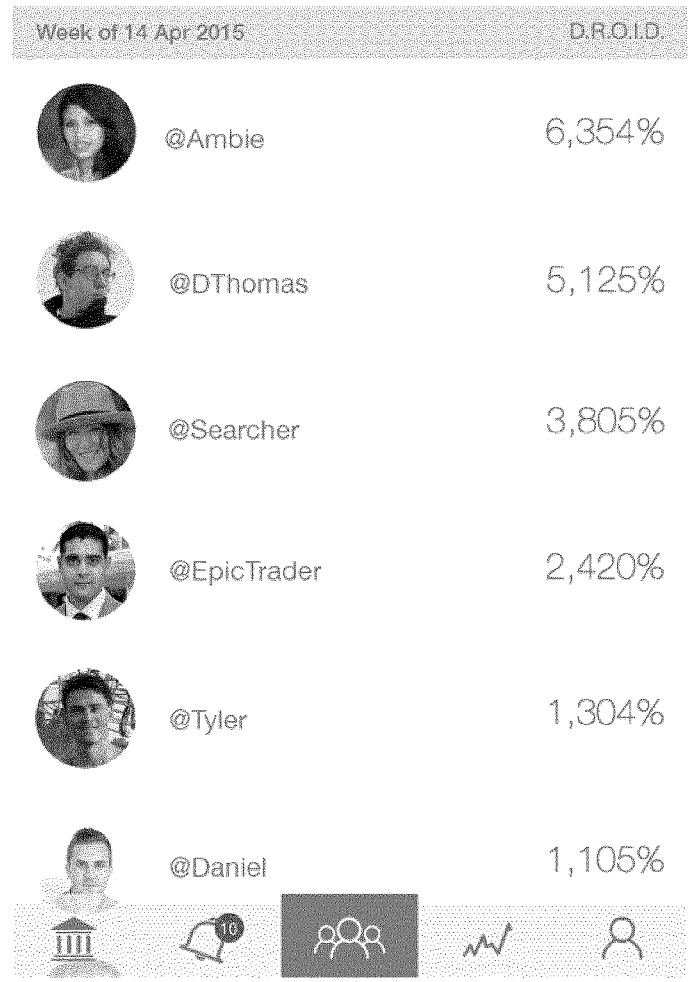

FIG. 19 illustrates the screen showing the top individuals on the Voleo platform as measured by the performance of their investment decisions. Their DROID or other DROID related performance measures will be displayed and selecting any individual, or their @handle, will open their public user profile page as described below (FIG. 20).

FIG. 20 illustrates a screen displaying a sample public user profile. It shows the DROID score and other DROID related performance measures of the user, along with a history of their investment decisions. Not shown is the portfolio of securities by value or quantity, as those details will remain private, but rather entry and exit prices by date, price and weighting, with sector, size and other analytic information. The page may contain a box which enables another user to follow the profiled user. This box, when selected, will cause notifications to be sent to the other user of each of that profiled user's investment decisions, whether they were carried out or not. The notification will not be sent immediately but will be sent at the time the trade has been either confirmed or expired without a positive vote. The notification will indicate whether it is a proposal or vote to buy or sell a specific security and the limit price, but it will not indicate the number of securities subject to the proposal or vote.

FIG. 21 illustrates the Notifications section which displays alerts to the user respecting various actions that might impact or otherwise be of interest to that user. Examples of these are discussions, proposals, votes, orders, invitations, follows (opt-in notifications of other fund activity or other user's DROID activity), and system updates. These may be categorised into those that require action and those that provide information, and users have some control over what notifications are brought to their attention and whether they appear in-application, are displayed as system notifications on their device, or are sent to them via email or other messaging system.

Figure 22:
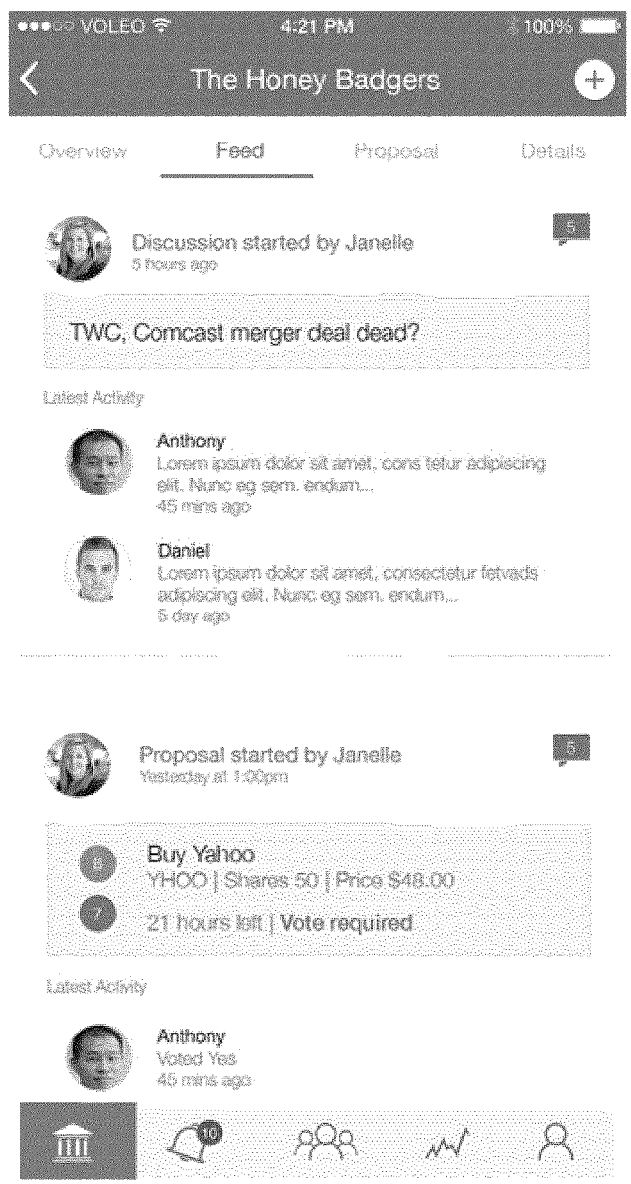

FIG. 22 illustrates the feed that will be contained within each fund section of the application. It will update automatically as discussions and proposals are created, or comments made, and bring the most recent items to the top. Feeds will feature the subject matter and proposer, a count of messages, and a summary of the latest activity. By clicking on any given feed object, the user will be taken to the relevant proposal or discussion where a full history of related activity will be available, and from which the user can contribute. As previously discussed, the 'plus' icon in the upper right will allow users to create new proposals or discussions.

Figure 23:

FIG. 23 illustrates a discussion thread, where a log of all comments relating to that thread can be found. At the bottom there is a section where users can add comments and send them to the group, impacting both the related thread and the feed section of the application. It may be possible to post links, images, files and other relevant content into discussions and proposals.

Figure 24:
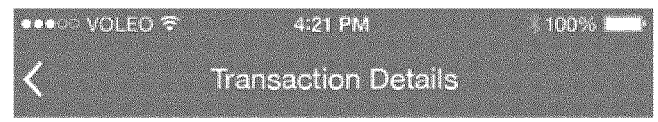

FIG. 24 displays transaction details relating to a specific security within a given fund, for example by selecting the security in FIG. 7. It indicates the holdings, details about book and market value, and a history of activity as it relates to that security (order type, price, quantity, date, and amount). Selecting the miniature chart icon, or sparkline, by the symbol and name of the security will navigate to the applicable stock research page.

Figure 25:
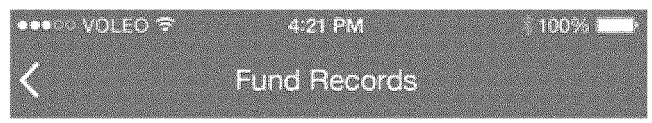
Figure 25:
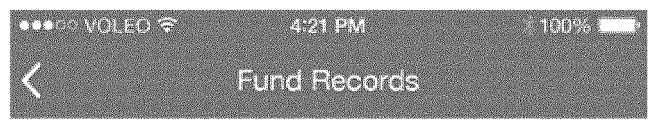

FIG. 25 illustrates two screen shots of the Fund Records section, where both a time-stamped log of all activity (lower screen) and a list of all transactions (upper screen) will be available. This serves as a record to partners as to what activity has taken place and at what time, and provides the history of transactions as required for regulatory purposes.

Figure 26:
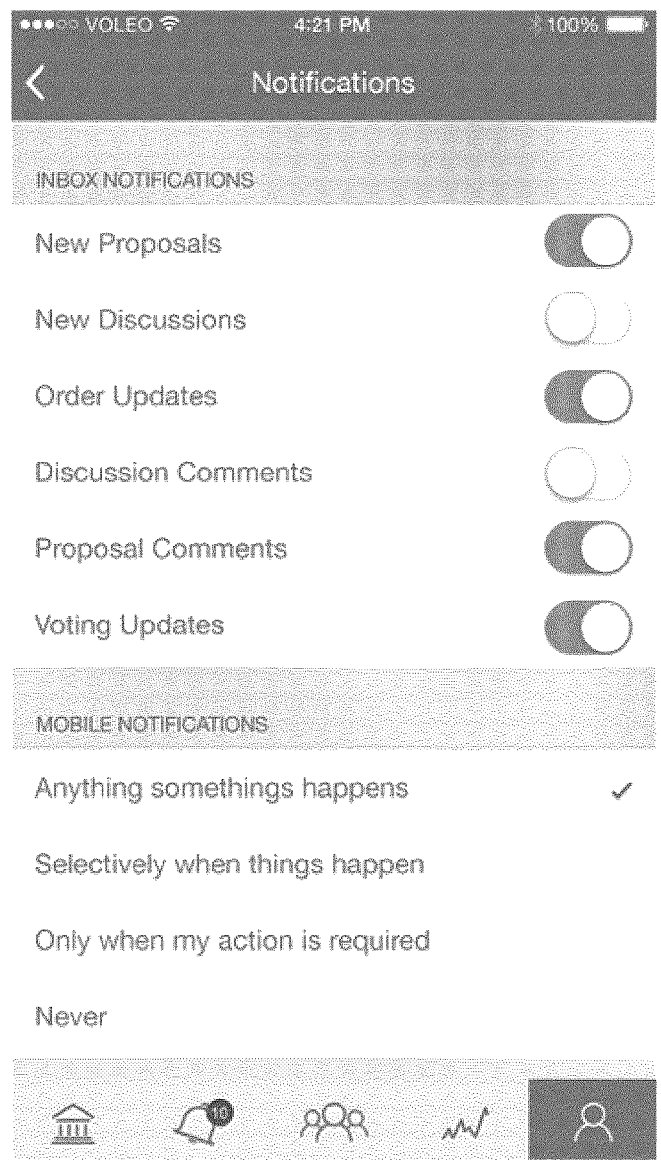

FIG. 26 illustrates a user's control page for notifications. Each setting can be toggled to manage notification settings; inbox settings enabling users to determine what type of activity is flagged to them in the Notifications section of the application and which mobile settings push to the user's device. Certain events may trigger notifications outside of the application, by email, text or otherwise.

Figure 28:
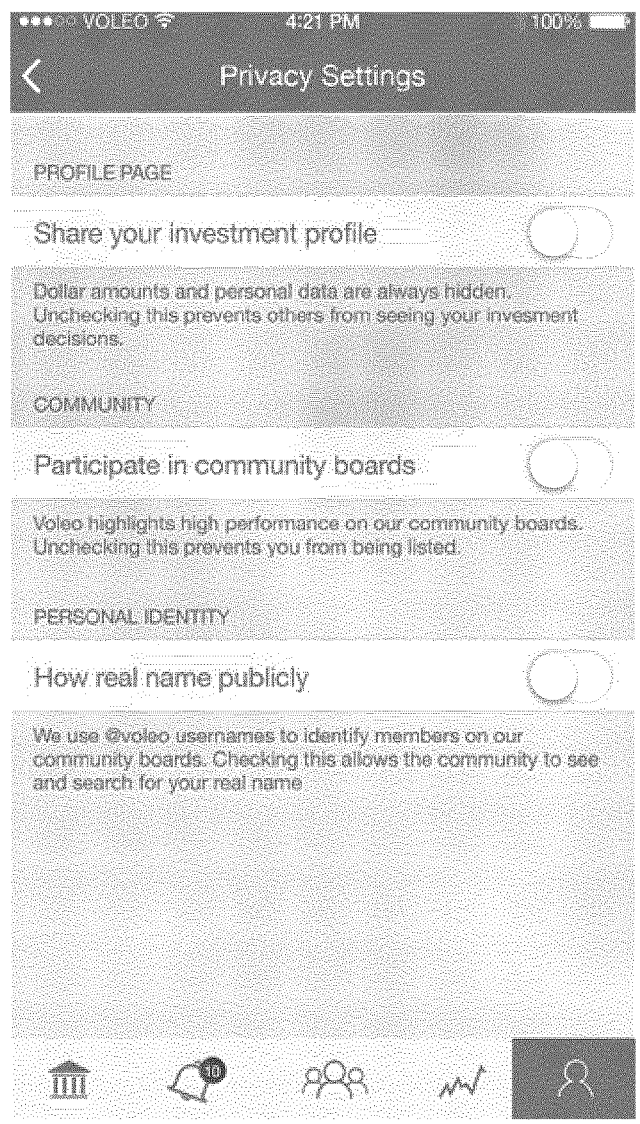

FIG. 27 is the user's own profile management page, within which they can update their profile, contact details, privacy settings, password, passcode, view version information and provide feedback. The Privacy Settings (FIG. 28) determine whether users share their investment profile, participate in community boards and reveal their identity.

Figure 29:
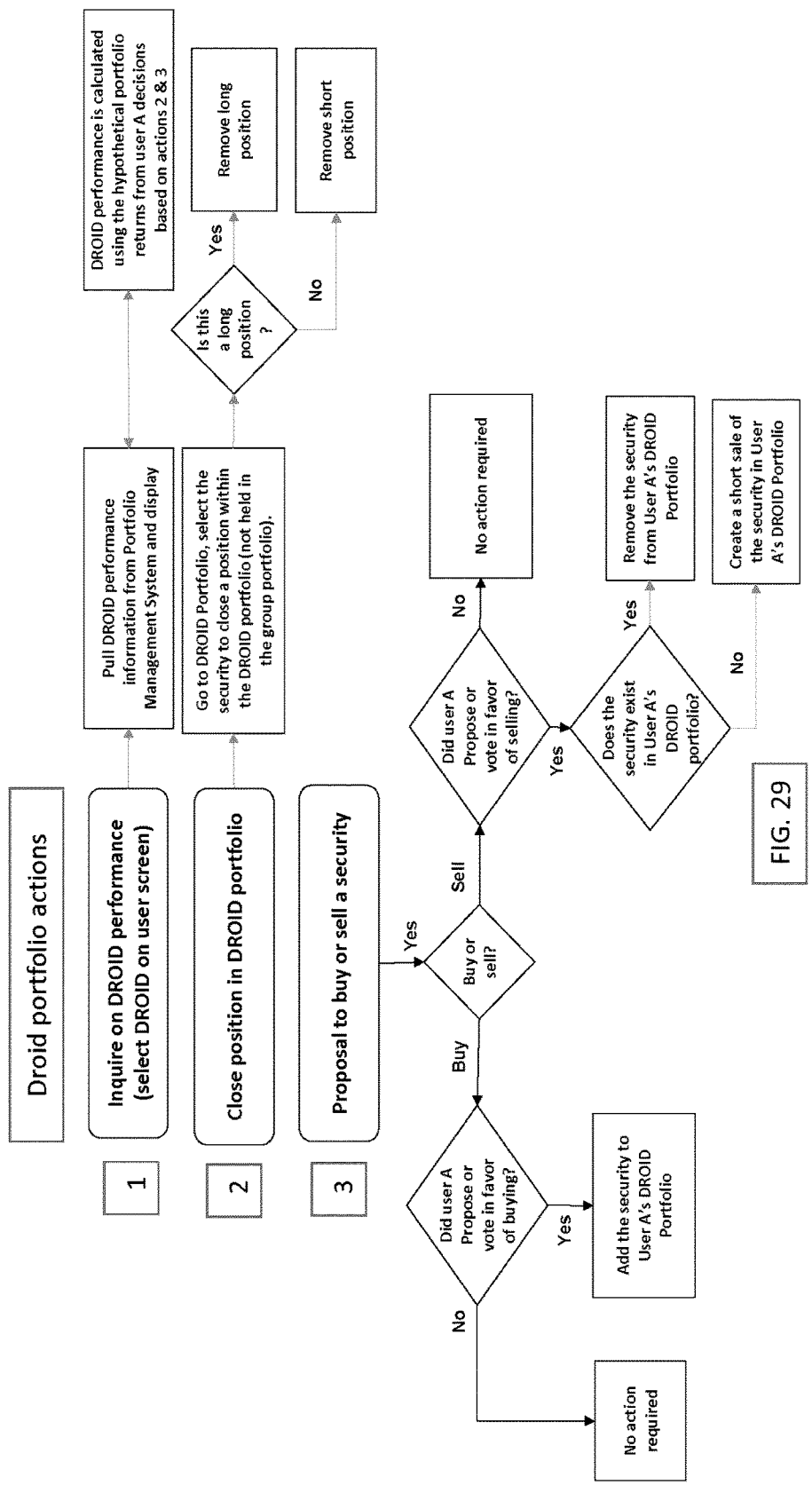
FIG. 29 is a flowchart illustrating the method of calculating a user's definitive return on investment decisions for accessing and display to other users.

FIG. 29 illustrates the process for continuously calculating a user's DROID for a fund. The calculation includes a 'real time' (less than 15 minute delay), market-to-market calculation of the user's DROID positions. It reflects the user's gain/loss as of the time of calculation. A user's DROID is calculated in percentage terms as the user's total return on all investment decisions made by the user in Voleo, both real and hypothetical. The contribution of actual returns on investment to a user's DROID are those returns made on actual positions held by the user across all Voleo funds that the user voted in favour of, including the current value of securities which are still held. The hypothetical returns on investment are the hypothetical returns on the hypothetical investments separately recorded in the user's My Decisions account, including the current value of positions which are still hypothetically held. Cash is not a component of the DROID portfolio; on opening a hypothetical position cash is deemed to have been deployed, there are no borrowing costs, and on closing a position the proceeds are deemed to be withdrawn. It is a real time market-to-market calculation of decisions that could be made by the user's Voleo funds.

Thus the DROID portfolio has certain limitations (i.e. you can only propose to buy so much of a position as your Voleo fund has available in cash; you can only short/sell a security that your Voleo fund is already long) but yet does not face constraints that a real portfolio would (i.e. a user could repeatedly put a proposal to his peers for the amount of cash in his Voleo fund, which if his/her peers continually reject could lead him to aggregate a very large long position, or vice versa for sales, as while each decision is limited by the amount of cash available in their Voleo fund an individual can according to the disclosed method make an unconstrained number of decisions using the same cash if his/her peers continually reject them).

With reference to the process for continuously calculating a user's DROID for a fund as illustrated in FIG. 29, where a user for example votes to buy on a proposal that is subsequently rejected by the group, a hypothetical long position is created within the My Decisions portfolio. The holding is then displayed in the My Decisions display in FIG. 8. After that position is locked or closed the related transactions will display in FIG. 15. Where the proposed trade which is the subject of the user's proposal or positive vote is carried out in whole or in part, the DROID portfolio is changed by the actual amount of the trade (by adding if a buy, subtracting if a sell). The effective price is the full gross price of the trade and the effective time is the actual date of the trade as opposed to settlement. Where the proposed trade which is the subject of the user's proposal or positive vote is not carried out because the target price was not reached, there is no effect on the DROID account. Where the proposed trade which is the subject of the user's proposal or positive vote was not executed even though the target price was reached, the DROID portfolio is changed by the full amount of the trade with the effective date being the date of the proposal. The effective price in the case of a "buy" order is the lesser of the market close on the trade expiry date and the target price. In the case of a "sell" order the effective price is the greater of the market close on the trade expiry date and the target price.

The embodiment disclosed above therefore utilizes both the features of a social network and the application of the system to mobile devices to provide advantages in the operation of online investment clubs. The present embodiments permit users to continuously and in real time follow and assess the investment skill of other investors in their own or other investment clubs and to follow such individuals' future investment decisions and those of other investment clubs in order to make their own investment decisions. The use of a computer network allows the system to maintain a constant real time evaluation of each user's investment decisions whether or not they were followed by the club, and ranks that valuation against all other users. Unlike in existing investment clubs, the social networking features of a computer network permit a user of the system to view all such rankings of other users in the system, and the performance of all other funds in the system, to choose to follow such other users or funds and use such information to assist the investment decisions of that user. Also the need for rapid decision-making among club members to invest effectively is met by the application of the system to mobile devices.

The embodiment disclosed above may also be applied to
i) simulated portfolios, which may be used in the field of education to improve financial literacy or to host competitions;
ii) stock market challenges, which may be in the form of competitions, or in the form of gaming applications where groups may compete among themselves for top hypothetical performance;
iii) advised portfolios, where instead of community the displayed portfolios are constructed by licensed investment advisors and individual users may follow the advisor of their choice based on transparent model portfolio track record; or iv) private securities, which could include but not be limited to private placements in private or public companies.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A computer-implemented method of organising groups of individual investors to form funds, each fund comprising a plurality of members of said fund, for purposes of actual or simulated investments, and operating said funds over a computer network, where said individual investors each have access to the internet, the method comprising:
   i) providing a server accessible to the internet and to a web server for displaying information to said individual investors wherein each said individual investor accesses the system using a mobile application;
   ii) providing a database for storing information;
   iii) said server adapted to receive, display and store real-time market data from a source of market data;
   iv) said server enabling groups of individual investors to form funds for the purpose of making joint investments in publicly-traded securities each said fund thereby comprising a plurality of individual investors each of which is a member of said fund;
   v) said server enabling a first member of a fund to make a proposal to the other members of said fund for the purchase of a given security on specified terms and for one or more members of the fund to vote on said proposal;
   vi) said server, in the case of an actual investment, enabling said funds to purchase securities through the appropriate stock exchange where said proposal has been accepted by the necessary majority of the members of the fund and the terms of the proposal have been satisfied;
   vii) said server maintaining historical decision data for each individual investor, wherein said historical decision data comprises both actual returns on investments where the individual investor voted in favour of a proposal that was accepted and the terms of the proposal have been satisfied, and hypothetical returns where the investor voted against a proposal that was accepted or voted in favour of a proposal that was not accepted and the terms of those proposals have been satisfied;
   viii) said server calculating a number representing a historical performance for each individual investor based on said historical decision data;
   ix) said server enabling any individual investors within a fund to view said number representing the historical performance of any other individual investors within the fund to assist in assessing proposals;
   x) said server enabling any individual investors within any funds in the system to view said number representing the historical performance of any other, or selected other, individual investors or funds; and
   xi) said server enabling any individual investors within any funds in the system to follow any other individual investors within any funds in the system;
wherein said historical decision data for an individual investor includes hypothetical short and long accounts, respectively where said individual investor proposed or voted to sell a security position which was not in said individual investor's hypothetical long account and where said individual investor proposed to purchase or voted to purchase a security position which was not approved by the members of the fund, and said server permits each said individual investor to close said hypothetical short and long accounts on a real-time basis at any time; and
wherein said server ranks said historical performance of any one or more of said individual investors against the historical performances of other individual investors and wherein said server enables any one or more of said individual investors within a fund in the system to view such rankings of other individual investors in the system, and the performance of other funds in the system, to choose to follow such other individual investors or funds and use such information to assist the investment decisions of said any one or more of said individual investors.

2. The method of claim 1 wherein said number representing the historical performance for each individual investor based on said historical decision data is calculated in real time in percentage terms as the individual investor's total return on all investment decisions made by the individual investor in all funds in the system, both actual and hypothetical; where the contribution of actual returns on investment to an individual investor's performance are those returns made on actual positions held by the individual investor across all funds that the individual investor voted in favour of, including the current value of securities which are still held; and the hypothetical returns on investment are the hypothetical returns on the hypothetical investments separately recorded in the individual investor's historical hypothetical decisions account, including the current value of positions which are still hypothetically held and have not been closed.

3. The method of claim 1 wherein said number representing the historical performance for each individual investor based on said historical decision data is calculated by using analytics based on said individual investor's decisions selected from the group consisting of alpha and/or beta risk ratios, Sharpe ratios, the contribution of proposals only, activity, consistency, performance against benchmark indices, and statistical relevance based on sample size.

4. A computer program product comprising a nontransitory computer readable storage medium having program code stored thereon, wherein the program code, when executed by a server accessible to the internet and to a web server for displaying information to said individual investors and comprising a database for storing information, organises groups of individual investors to form funds, each fund comprising a plurality of members of said fund, for purposes of actual or simulated investments, and operates said funds over a computer network, where said individual investors each have access to the internet using a mobile application, and performs the following tasks:
   i) receiving, displaying and storing real-time market data from a source of market data;
   ii) enabling groups of individual investors to form funds for the purpose of making joint investments in publicly-traded securities each said fund thereby comprising a plurality of individual investors each of which is a member of said fund;
   iii) enabling a first member of a fund to make a proposal to the other members of said fund for the purchase of a given security on specified terms and for one or more members of the fund to vote on said proposal iv) in the case of an actual investment, enabling said funds to purchase securities through the appropriate stock exchange where said proposal has been accepted by the necessary majority of the fund and the terms of the proposal have been satisfied;
v) maintaining historical decision data for each individual investor, wherein said historical decision data comprises both actual returns on investments where the individual investor voted in favour of a proposal that was accepted and the terms of the proposal have been satisfied, and hypothetical returns where the investor voted against a proposal that was accepted or voted in favour of a proposal that was not accepted and the terms of those proposals have been satisfied;
vi) calculating a number representing a historical performance for each individual investor based on said historical decision data;
vii) enabling any individual investors within a fund to view said number representing the historical performance of any other individual investors within the fund to assist in assessing proposals;
viii) enabling any individual investors within any funds in the system to view said number representing the historical performance of any other, or selected other, individual investors or funds; and
ix) enabling any individual investors within any funds in the system to follow any other individual investors within any funds in the system;

wherein said historical decision data for an individual investor includes hypothetical short and long accounts, respectively where said individual investor proposed or voted to sell a security position which was not in said individual investor's hypothetical long account and where said individual investor proposed to purchase or voted to purchase a security position which was not approved by the members of the fund, and said server permits each said individual investor to close said hypothetical short and long accounts on a real-time basis at any time; and wherein said server ranks said historical performance of any one or more of said individual investors against the historical performances of other individual investors and wherein said server enables any one or more of said individual investors within a fund in the system to view such rankings of other individual investors in the system, and the performance of other funds in the system, to choose to follow such other individual investors or funds and use such information to assist the investment decisions of said any one or more of said individual investors.

* * * * *